Figure 1:
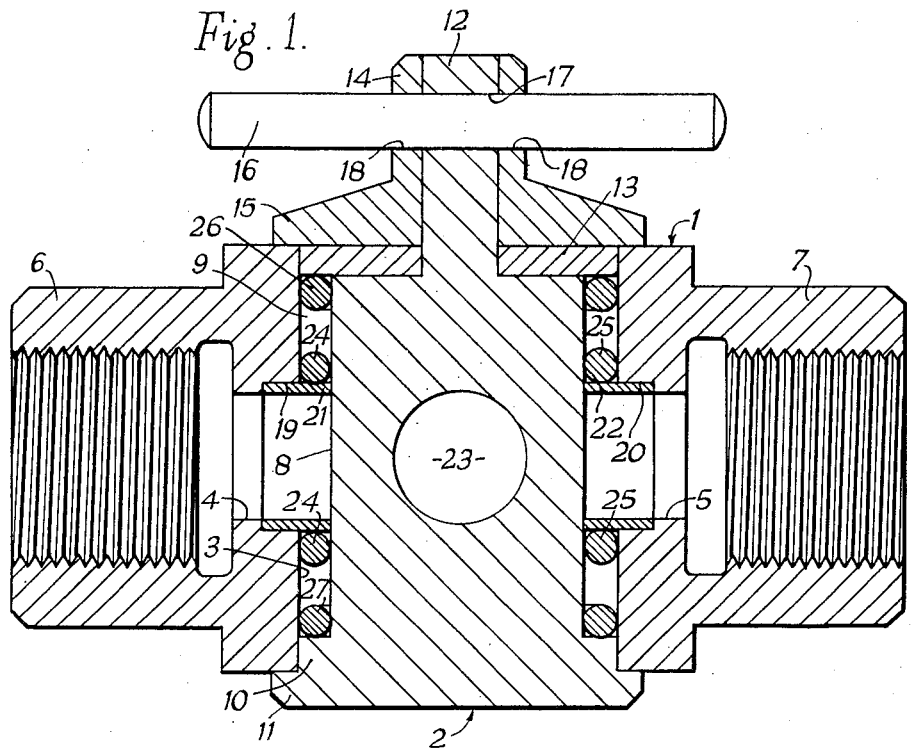

Dec. 12, 1961 T. F. CRANG 3,012,753
ROTARY VALVES
Filed Sept. 16, 1959

INVENTOR
Terence F. Crang
BY
Ralph B. Stewart
ATTORNEY

United States Patent Office 3,012,753
Patented Dec. 12, 1961

3,012,753
ROTARY VALVES
Terence Fursdon Crang, Cowes, Isle of Wight, England, assignor to Kinematics Limited, London, England, a British company
Filed Sept. 16, 1959, Ser. No. 840,271
3 Claims. (Cl. 251—317)

This invention relates to rotary valves and more particularly to plug cocks or like valves which include a valve body having a cylindrical or tapered bore, fluid inlet and outlet ducts leading respectively to and from the said bore, and a cylindrical or frusto-conical plug having at least one transverse passage adapted to be brought into or out of register with the said ducts by relative rotation of the plug and the valve body. Such cocks or valves are hereinafter referred to as valves of the kind specified.

One of the main considerations in the construction of valves of this kind is the provision of adequate means for preventing the leakage of fluid between the valve body and each end of the plug, and, when the valve is closed, for preventing the leakage of fluid around the circumference of the plug from the inlet port or ports to the outlet port or ports.

For this purpose it is usual to provide packing rings or other sealing members which fit closely within grooves or recesses in one of the relatively rotatable parts of the valve and are adapted to be in sealing contact with sealing surfaces on the other relatively rotatable part.

It is a disadvantage of this arrangement that it is necessary, if it is desired to utilize the pressure of the controlled fluid to urge the sealing members against the sealing surfaces, to provide sealing members of special design, such as cup-leather packings, or to provide passages leading from a suitable location, such as an inlet port, to the said grooves or recesses in order to obtain fluid pressure behind the sealing members.

It is a further disadvantage, in the case of sealing rings disposed around the inlet or outlet ports of already known valves, that it is necessary to accommodate these rings in grooves that are arcuately curved in two different planes.

It is an object of the present invention to obviate the aforesaid disadvantages and to provide an improved valve of the kind specified which may be provided with adequate sealing arrangements without the necessity of performing elaborate machining operations.

It is another object of the invention to provide an improved valve of the kind specified wherein simple resilient O rings may be employed as the sealing rings, and wherein the pressure of the controlled fluid may be utilized to urge the O rings against the sealing surfaces.

It is a further object of the invention to provide an improved valve of the kind specified which is of simple construction, which is easy to assemble, and which is readily dismantled for replacement of damaged, worn or deteriorated sealing rings.

According to the invention, there is provided a valve of the kind specified, wherein the diameter of the plug over the greater part of its length is less than that of the bore of the valve body and the plug is disposed within the bore of the valve body so as to provide an annular space in which are accommodated sealing rings which are in sealing contact with both the plug and the wall of the bore of the valve body, the inlet and outlet ducts each being surrounded by a corresponding duct sealing ring supported on a tubular member projecting inwardly from the wall of the bore of the valve body so as to form an extension of the respective duct and having its inner end shaped to fit in close sliding contact with the surface of the plug; two plug sealing rings being arranged to encircle the plug on opposite sides respectively of the transverse passage, and each of the said plug sealing rings being so arranged in relation to a corresponding abutment surface which projects at least partly across the said annular space that any leakage of fluid past one of the duct sealing rings will cause the plug sealing rings to be pressed against the corresponding abutment surfaces and thereby expanded into closer sealing contact with the plug and the wall of the bore of the valve body.

Figure 2:
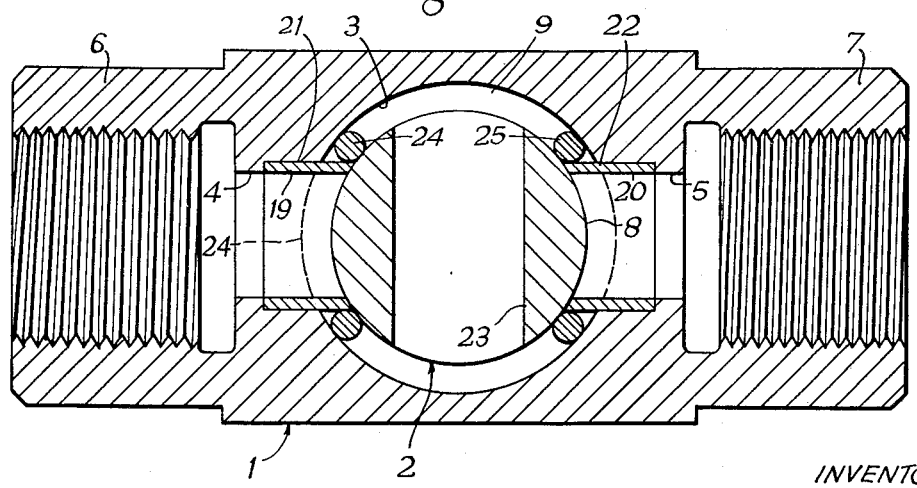

The invention will now be described, by way of example, with reference to the accompanying drawings in which FIGS. 1 and 2 are a vertical section and a horizontal section respectively of a plug cock shown in its closed position.

Referring to the drawings, the valve body is indicted generally by the reference 1 and the plug is indicated generally by the reference 2. The valve body 1 is of rectangular cross-section and has a central cylindrical bore 3 in which the plug 2 is disposed. A pair of diametrically opposite cylindrical ducts open into the bore 3 and comprise an inlet duct 4 and an outlet duct 5. Tubular pipe sockets 6 and 7, coaxial with the ducts 4 and 5, extend from opposite sides of the valve body 1, and have a screw-threaded bore adapted to receive the screw-threaded end of a pipe or pipe coupling member or other fitting.

The plug 2 has for the greater part of its length a cylindrical wall 8, the diameter of which is less than that of the bore 3 so as to provide an annular space 9 between the plug and the valve body. The plug is provided at one end with an integral collar 10 which is a close fit within the bore 3, and an integral flange 11 which is adapted to abut the bottom face of the valve body. A stem 12 extending from the other end of the plug carries a collar or disc 13 which is a close fit within the bore 2, and, when the valve is assembled, lies flush with the top face of the valve body. The stem 12 also carries a sleeve 14 which is co-extensive therewith and has a flange 15 which abuts the collar 13 and the top face of the valve body. The sleeve 14 is secured to the stem 12 by a tommy bar 16 which extends through aligned holes 17 and 18 in the stem and the sleeve, respectively, and serves as a handle for rotating the plug. The handle 16 may be releasably secured to the plug, for example by a grub screw or a split pin (not shown).

The ducts 4 and 5 have counterbores 19 and 20, respectively, to receive tubular elements constituted by tubular spigots 21 and 22 which have an internal diameter equal to that of the ducts and which extend into the annular space 9. The spigots 21, 22 are shaped at their inner ends so as to fit closely to the cylindrical walls 8 of the plug. The spigots 21, 22 are a push fit or force fit in the counterbores 19, 20. Alternatively, they may be brazed or sweated in position.

A transverse cylindrical passage 23 in the plug is of the same diameter as the ducts 4, 5 and is coaxial therewith when the plug is rotated through 90 degrees from the closed position illustrated. In the open position of the valve, the ports 4, 5, the spigots 21, 22 and the passage 23 form a continuous uniform passage through the valve body. Suitable limit stops may be provided in known manner to arrest the plug in the open and closed positions.

Duct sealing rings 24 and 25 are accommodated in the annular space 9 and surround the spigots 21 and 22, respectively. The duct sealing rings 24, 25 are O rings of rubber or like resilient material and have a cross-sectional diameter slightly greater than the width of the annular space 9 so that they are compressed in an axial direction on assembly. The duct rings 24, 25 are of slightly smaller internal diameter than the external diameter of the spigots 21, 22 so that each ring, when assembled on a spigot, is given an initial tension which is increased when the rings are bent to conform to the shape of the wall 8, as shown by broken lines in FIG. 2, as a result of the plug being pushed through the rings on assembly.

Plug sealing rings 26 and 27 are also accommodated in the annular space 9 and surround the plug 2 on opposite sides respectively of the passage 23. The plug sealing rings 26, 27 are of similar material and cross-section to the duct rings 24, 25, and are also compressed on assembly, but in a radial direction.

The sealing arrangement is such that there are two sealing rings opposing any escape of fluid from the valve and, when the valve is closed, opposing the escape of fluid from the inlet duct 4 to the outlet duct 5. Moreover, in the event of fluid leaking past the inlet duct ring 24 or, when the valve is open, past the outlet duct ring 25, the plug rings 26, 27, which normally may be in any position in the annular space 9 between the collars 10, 13 and the duct rings 24, 25, are pressed by the accumulated pressure fluid against abutment surfaces constituted by the collars 10 and 13 and as a consequence are expanded into closer sealing contact with the plug 2 and the wall of the bore 3 of the valve body 1. In the case of leakage past the inlet duct ring 24, when the valve is closed, accumulated pressure fluid acts to increase the pressure of the outlet duct ring 25 against the surfaces of the spigot 22 and as a consequence the ring 25 is expanded into closer sealing contact with the plug 2 and the wall of the bore 3 of the valve body 1.

The invention may also be applied to a valve having a plug with a branched transverse passage, or more than one passage in the same plane, or more than one passage in different planes. In the latter case a plug sealing ring may be provided between each passage as well as the plug rings adjacent the ends of the bore in the valve body. The invention is also applicable to valves having tapered or frusto-conical plugs. In this case the plug sealing rings will have different diameters chosen so that the rings are normally in contact with the collars disposed in the ends of the bore of the valve body.

Alternative means may be provided for retaining the port sealing rings in position. For example the spigots may be screwed into circular bores in the valve body or the spigots may be formed integrally with the valve body.

As an alternative to the illustrated construction in which the plug is inserted at the bottom of the valve body, the handle, the upper flange and collar and the plug may be formed together as a hot brass pressing for insertion at the top of the valve body while the lower flange and collar are formed as a separate member adapted to be secured to the plug by set-screws or the like. In a larger form of valve than the plug cock illustrated the pipe sockets are replaced by pipe connecting flanges and the operating handle is a square key or spanner which engages a squared portion of the valve stem and is retained thereon by a nut.

I claim:

1. A valve comprising: a valve body having a bore of circular cross-section and inlet and outlet ports formed therein; a rotary plug of circular cross-section mounted within said bore and having formed therein a transverse passage movable upon rotation of said plug into and out of alignment with said ports, the diameter of said plug being smaller than the diameter of said bore to define an annular space between said plug and said bore; resilient bore sealing rings encircling said plug on opposite sides of said ports to seal the ends of said annular space; tubular members aligned with said ports and projecting inwardly of said bore to define extensions of said inlet and outlet ports across said annular space, said tubular members having inner ends shaped to fit in close sliding contact with the surface of said plug; and a resilient duct sealing ring in said annular chamber closely encircling each of said tubular members and making sealing contact with said plug and said bore, said annular chamber being open about said duct sealing rings to permit unrestricted expansion thereof away from said tubular members.

2. The valve defined by claim 1 in which said bore and said plug are cylindrical.

3. The valve defined by claim 1 in which said inlet and outlet ports are formed having counterbores therein and said tubular members are force fit in said counterbores.

References Cited in the file of this patent

UNITED STATES PATENTS

| | | |
|---|---|---|
| 262,935 | Dibble | Aug. 22, 1882 |
| 449,161 | Lacy | Mar. 31, 1891 |
| 2,433,732 | Brown | Dec. 30, 1947 |
| 2,510,514 | Mueller | June 6, 1950 |
| 2,594,173 | Jensen | Apr. 22, 1952 |
| 2,604,293 | Phillips | July 22, 1952 |
| 2,628,809 | Mikeska | Feb. 17, 1953 |
| 2,845,948 | Parker | Aug. 5, 1958 |